(12) United States Patent
Scott et al.

(10) Patent No.: US 10,122,412 B2
(45) Date of Patent: Nov. 6, 2018

(54) POWER LINE COMMUNICATION SYSTEM AND METHOD OF AUTO-COMMISSIONING SYSTEM NODES

(71) Applicant: ABL IP Holding, LLC, Conyers, GA (US)

(72) Inventors: Jeffrey Michael Scott, San Pablo, CA (US); Michael Miu, Castro Valley, CA (US)

(73) Assignee: ABL IP Holding, LLC, Conyers, GA (US)

( * ) Notice: Subject to any disclaimer, the term of this patent is extended or adjusted under 35 U.S.C. 154(b) by 0 days.

(21) Appl. No.: 15/883,678

(22) Filed: Jan. 30, 2018

(65) Prior Publication Data

US 2018/0219582 A1    Aug. 2, 2018

Related U.S. Application Data

(60) Provisional application No. 62/452,312, filed on Jan. 30, 2017.

(51) Int. Cl.
*H04B 3/54* (2006.01)
*H05B 33/08* (2006.01)
*H04B 3/58* (2006.01)

(52) U.S. Cl.
CPC ............ *H04B 3/542* (2013.01); *H04B 3/546* (2013.01); *H04B 3/548* (2013.01); *H05B 33/0803* (2013.01); *H04B 3/58* (2013.01)

(58) Field of Classification Search
CPC ........ H04B 3/542; H04B 3/546; H04B 3/548; H04B 3/58; H04B 3/56; H01F 38/14; H05B 33/0833; H05B 37/0263; H05B 33/0803; H05B 3/548; H05B 3/54

USPC .................................. 340/12.32, 3.21; 307/4
See application file for complete search history.

(56) References Cited

U.S. PATENT DOCUMENTS

| 5,986,539 | A  | 11/1999 | Johansson et al. |
| 6,995,658 | B2 | 2/2006  | Tustison et al.  |
| 7,230,522 | B2 | 6/2007  | Stevens          |
| 8,296,488 | B2 | 10/2012 | Westrick, Jr. et al. |
| 8,674,539 | B1 | 3/2014  | Magin et al.     |
| 9,391,452 | B1 | 7/2016  | Cousinard et al. |

(Continued)

FOREIGN PATENT DOCUMENTS

| EP | 0470185 | 11/1995 |
| EP | 1536572 | 6/2005  |

OTHER PUBLICATIONS

Singh, Ajinder and Hermann, Dave, "TI Designs: DC Power-Line Communication Reference Design," TIDU160, Oct. 2013.

*Primary Examiner* — Ali Neyzari
(74) *Attorney, Agent, or Firm* — Beeson Skinner Beverly, LLP

(57) ABSTRACT

A power line communication system and method permit auto-commissioning of multiple device control modules on a DC power line during the power up of the system. Device control modules associated with the peripheral devices are powered up sequentially and a unique address is assigned to each device controller when it is powered up. The device control modules have a unique circuit configuration that allows the use of inexpensive and mostly passive components. The cost effectiveness of the device controller design becomes particularly significant in applications, such as multi-panel OLED lighting fixtures, with high node counts.

25 Claims, 17 Drawing Sheets

(56) References Cited

U.S. PATENT DOCUMENTS

| | | | |
|---|---|---|---|
| 9,396,868 B2 * | 7/2016 | Yu | H04B 3/56 |
| 9,408,258 B2 | 8/2016 | Siessegger | |
| 9,420,670 B1 | 8/2016 | Xiong et al. | |
| 9,622,329 B2 | 4/2017 | Campbell | |
| 2011/0134976 A1 * | 6/2011 | Fossion | H04B 3/548 |
| | | | 375/222 |
| 2013/0300208 A1 * | 11/2013 | Yu | H04B 3/56 |
| | | | 307/104 |
| 2014/0103706 A1 | 4/2014 | Agusti Costa et al. | |
| 2017/0093230 A1 | 3/2017 | Yundt et al. | |

* cited by examiner

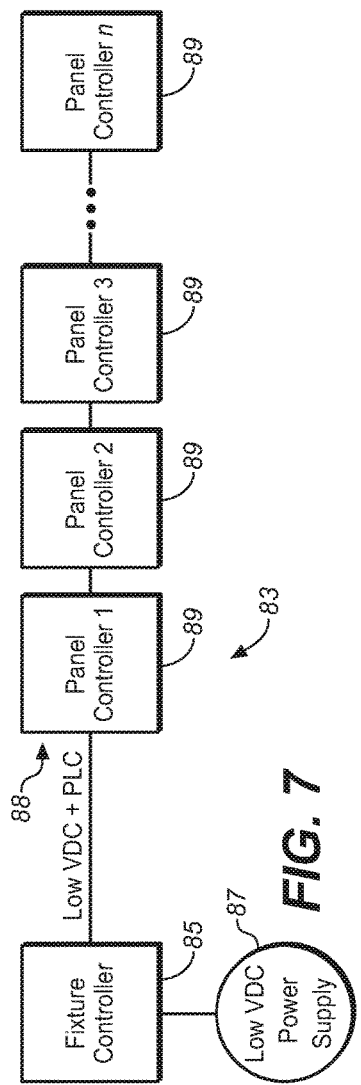
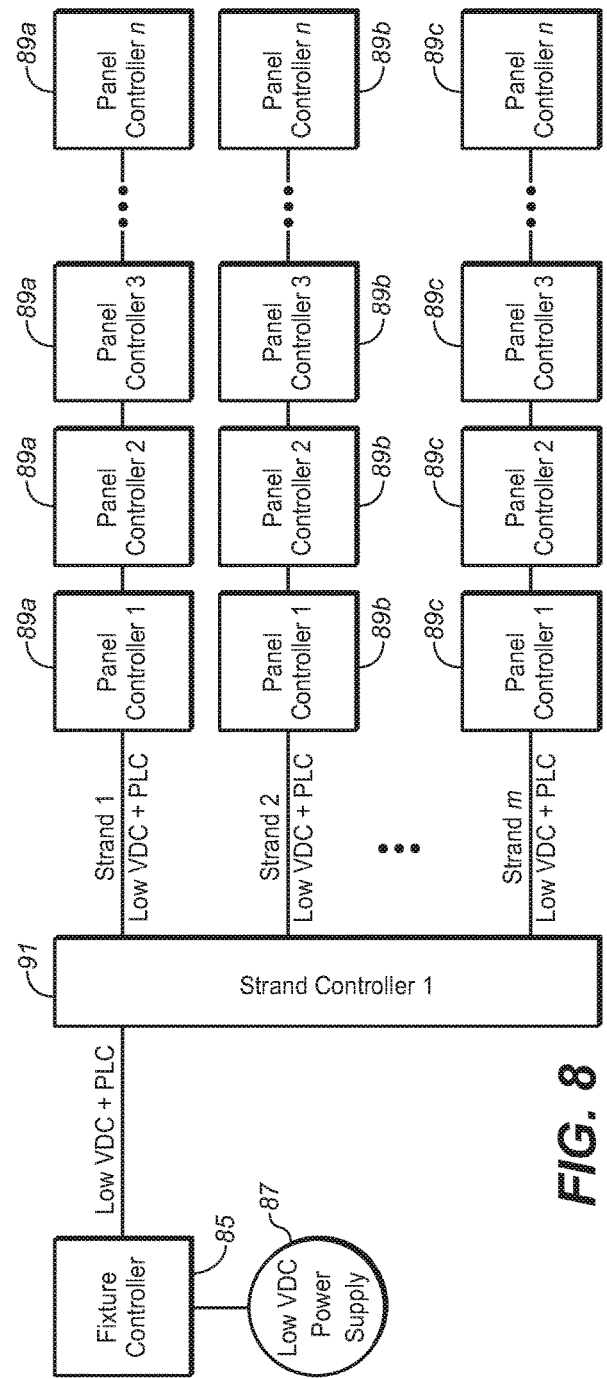
FIG. 7
FIG. 8

POWER LINE COMMUNICATION SYSTEM AND METHOD OF AUTO-COMMISSIONING SYSTEM NODES

CROSS-REFERENCE TO RELATED APPLICATIONS

This application claims the benefit of U.S. Provisional Patent Application No. 62/452,312 filed Jan. 30, 2017.

GOVERNMENT RIGHTS

This invention was made with Government support under U.S. Department of Energy Award No. DE-EE0007073. The Government has certain rights in the invention.

BACKGROUND

The present invention generally relates to methods for monitoring and controlling multiple devices connected to a common power line, and more particularly to a DC power line communication system. The invention has particular application to monitoring and controlling lighting elements or fixtures of a lighting system over a DC power buss to which the lighting elements or fixtures are connected. However, it will be appreciated that the invention will have other applications where it is desired to monitor and/or control multiple devices powered from a common low voltage DC power line.

Power line communication (PLC) systems used for controlling multiple components of a closed system, such as the lighting elements of a lighting system or fixture, are well known. Such systems allow inter-component communications to be achieved without bulky wiring and complicated configurations. However, such systems generally are not easily serviced when addressable components of the system need to be replaced or exchanged. They also have another disadvantage, in that communication nodes used with the lighting elements typically involve relatively costly parts that, when multiplied over many addressable components, can add tremendous cost to the system. The present invention allows for the implementation of a DC power line communication system with relatively inexpensive components and one that provides for an auto-commissioning capability during the power up which eliminates operational drawbacks of conventional PLC systems. The PLC system in accordance with the invention can be implemented in conventional DC two-wire wiring configurations without the need to add extra communication lines, and it allows the system-connected devices to be easily serviced or replaced.

SUMMARY OF THE INVENTION

The present invention provides for a PLC system and method that permit serial communications with and between multiple peripheral devices connected to and powered from a common DC power line. The devices could be lighting elements of a light fixture or system, or other devices capable of being sensed or controlled, for example, proximity sensors, smoke detectors, messaging devices and/or alarms.

In one of its aspects, the system and method of the invention provide for auto-commissioning multiple device control modules (sometimes referred to as "nodes," "device controllers," "panel controllers," or simply "controllers") for multiple devices, wherein device control modules associated with the peripheral devices are powered up sequentially and wherein a unique address is assigned to each device controller when it is powered up. If a device and associated controller are added, replaced, or removed, the system set-up will remain unaffected, as the added, replaced, or removed device will be assigned a unique address every time the system is repowered up.

In another aspect of the invention, the device control module will have a configuration that allows the use of inexpensive and mostly passive components. The configuration allows node costs to be substantially reduced and also allows for data rates high enough to provide real-time control of the device modules. (The device controller described herein can provide high baud rates of 500 Kbaud or more.) The cost effectiveness of the device controller design becomes particularly significant in applications, such as multi-panel OLED lighting fixtures, with high node counts.

The device controller also operates at low power so as to not adversely affect the efficacy of the system, and provides clean power to the device loads on the system so as to not cause noise problems or other unwanted effects such as optical flickering in lighting devices. The device controller further allows for the use of twisted pair wire in a differential communication mode avoiding the need for coaxial cables and helping to minimize both accepted and emitted EMI/RFI.

BRIEF DESCRIPTION OF THE DRAWINGS

FIG. 7 is a schematic drawing of a small power line communication system in accordance with the invention for a lighting fixture having a single strand of light sources suitably in the form of OLED panels.

FIG. 8 is a schematic drawing of a large power line communication system in accordance with the invention for a lighting fixture having multiple strands of light sources, suitably in the form of OLED panels, and a strand controller.

DETAILED DESCRIPTION OF THE ILLUSTRATED EMBODIMENTS

Figure 1:
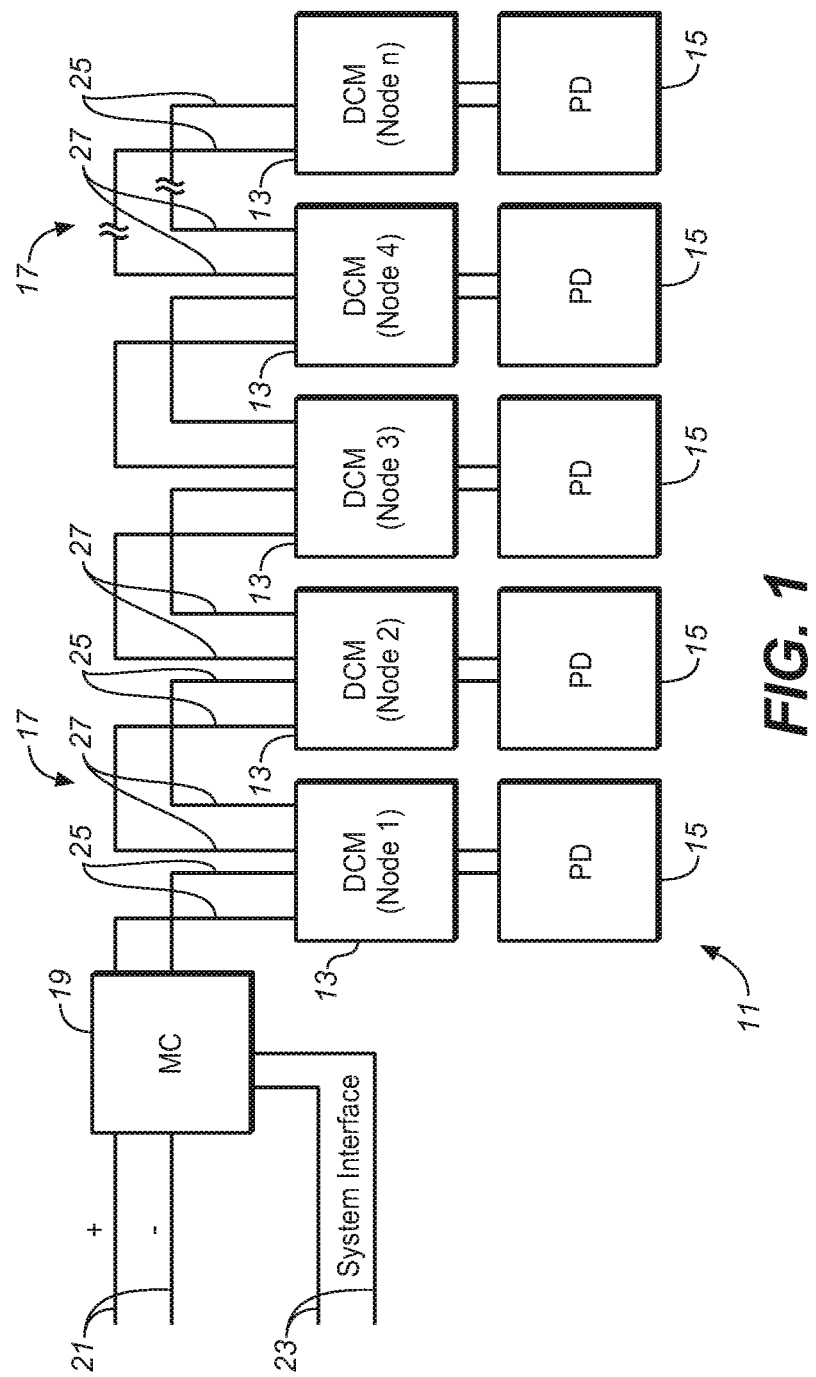
FIG. 1 is a schematic drawing of an exemplary topology for a power line communication system in accordance with the invention, showing multiple device control modules daisy-chained together.

FIG. 1 illustrates the general configuration of a PLC system 11 in accordance with the invention wherein multiple device control modules or "nodes" 13 associated with multiple peripheral devices 15 are connected to a common DC power line or buss 17. As hereinafter described, communication over the DC power line occurs by means of sequences of voltage pulses transmitted on the DC power line, wherein the voltage pulses represent serial digital data or control signals capable of being processed locally at any system node. A master controller 19 is suitably provided at the front end of the PLC system for use in powering-up of the system. The shown positive and negative wire inputs 21 to the master controller are from a source of DC power, most suitably at 12 volts DC; however, the master controller could alternatively include an AC-DC converter to accommodate an AC power feed. System control interfaces, for example dimmer switches of a lighting system, can also be connected to the master controller as illustrated by wire connections 23.

As hereinafter described, each of the device control modules is addressable, and as hereinafter described, the primary role of the master controller is to assign addresses to the device control modules connected to the common DC power buss during power-up. When the system is switched on, the master control 19 sequentially communicates with each of the device control modules to sequentially assign unique addresses to each device control module. Once unique addresses are assigned, the master controller will be able to communicate with the device control modules over the DC power buss.

Figure 2:
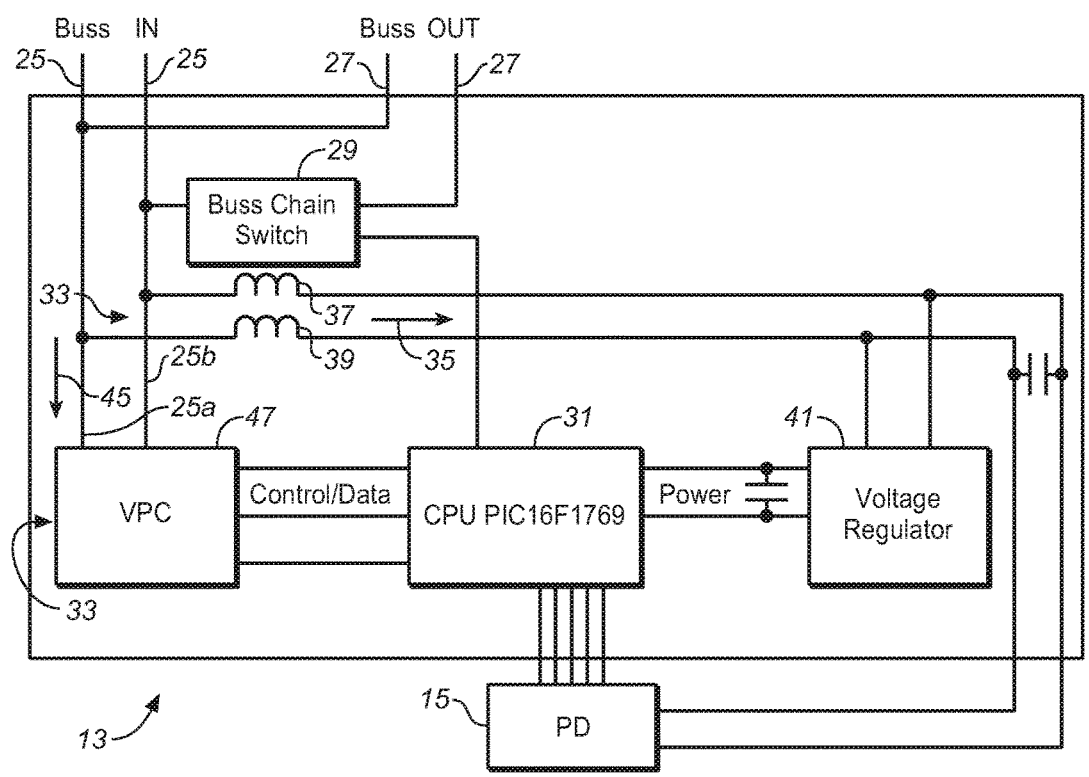
FIG. 2 is a circuit diagram of a device control module making up each of the nodes of the PLC system, showing a module with an analog input circuit having a DC power path and a digital signal communication path, and additionally with a sequencing switch used for sequentially powering up each device control module on the PLC system one module at a time.

FIG. 2 is a functional block diagram of an individual device control module shown in FIG. 1. Each control module 13 has an input comprised of input wire pairs 25 and an output comprised of output wire pairs 27. From FIG. 1 it is seen that the control modules are daisy chained together such that any one of the control modules after the first module is connected to the power buss through its upstream control module or modules. This connection is controlled through the power line switch 29 (referred to herein as a "buss chain switch") in each of the control modules; activation of this switch connects the device control module to the power buss 17 for allowing communication with the next control module in the chain. This serial activation of the chain buss switches of the daisy-chained control modules uniquely allows for the auto-commissioning procedure described herein. Until the buss chain switch of a control module in the chain is switched on, downstream control modules are off the power buss and cannot receive communications from or respond to the master controller.

With further reference to FIG. 2, the device control module 13 is seen to include a central computer processing unit (CPU) 31, which can be a suitable UART enabled computer chip, and an analog input circuit 33. The analog input circuit has two basic functions: it provides a path for serial digital communications with the CPU and a separate DC power path. The separate DC power path is denoted by the arrow 35 and is configured to allow DC power to pass through this circuit path while blocking voltage pulses superimposed on the DC power line wires, referred to herein as "AC blocking." AC blocking is achieved by in-line inductors 37, 39 placed in this path. (Later described is a technique for minimizing the size of the inductors needed to reject the incoming voltage pulses on the DC power line.) The inductors act to isolate the DC power supply from the communications signals.

It is seen that the DC power passing through the DC power path powers the CPU 31 through voltage regulator 41; it also powers the peripheral device 15 associated with the device control module. The digital signal communication path, denoted by the arrow 45, is on the other hand configured to block DC power while passing through the voltage pulses superimposed on the DC power line. This path provides a transmission path through which the CPU, and particularly the UART embedded in the CPU, can receive properly conditioned serial digital data and control signals from the master control unit. The configuration that achieves this is a simple, low cost voltage pulse conditioning (VPC) circuit 47 shown in front of the CPU 31. This simple circuit, which is described in greater detail below and which is comprised mostly of passive components, will allow for high baud rates of 500 Kbaud+, making it ideal for applications like multi-panel OLED lighting fixtures where serviceability and cost are an issue due to high node counts.

Figure 3:
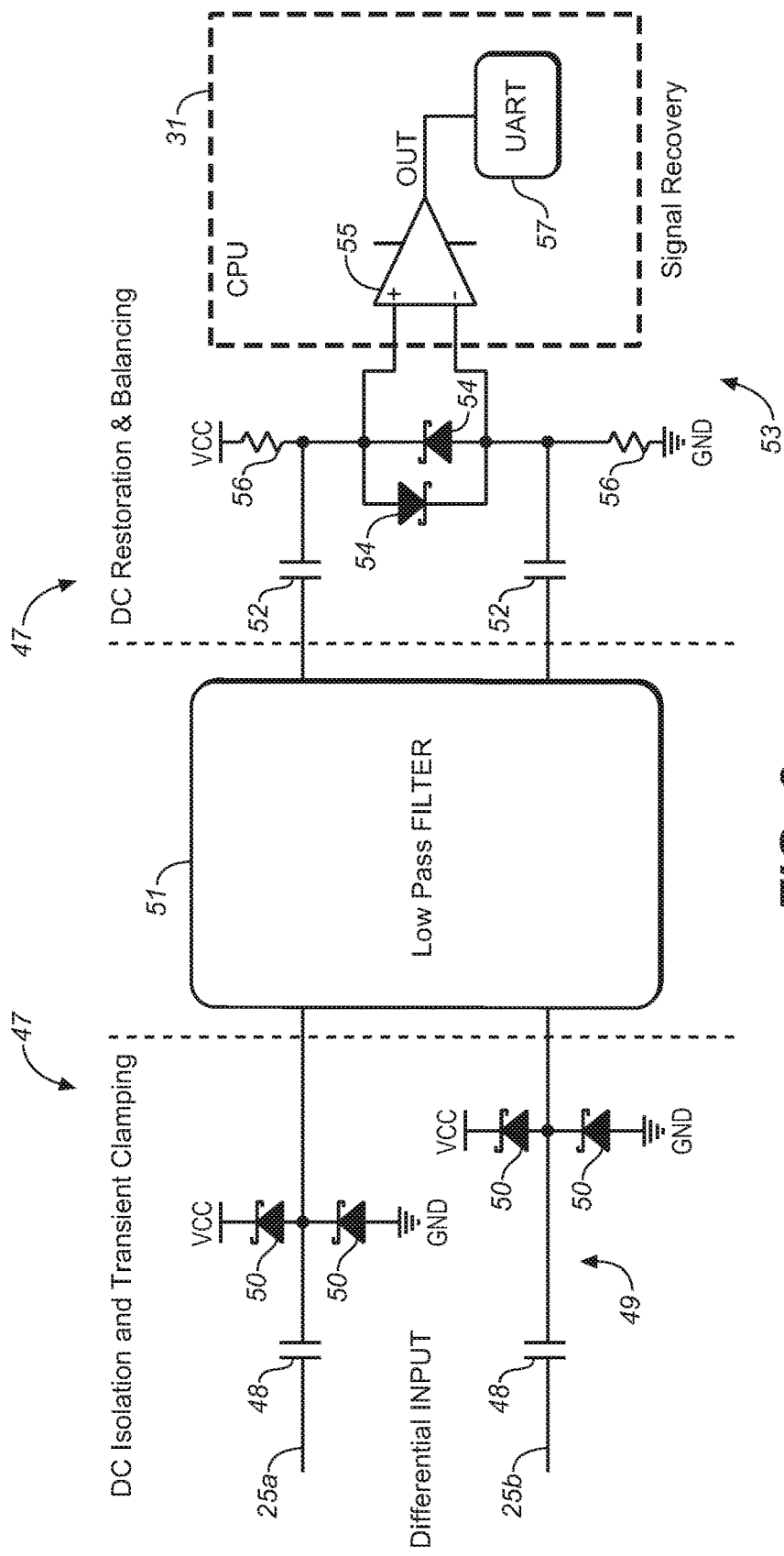
FIG. 3 is a circuit diagram illustrating a configuration for the digital signal communication path of the analog input circuit of the device control module.

FIG. 3 shows in greater detail the VPC circuit 47 of the device control module. This circuit is seen to have an input section 49 for receiving a differential input (differential voltage pulses on two wires 25a, 25b of the DC power lines), followed by a low pass filter section 51, and a backend section 53. The input section 49 of the VPC circuit provides DC isolation on the wires 25a, 25b, such that what remains on each wire are voltage pulses of opposite polarity. The DC isolation is provided by coupling capacitors 48, while a set of clamping diodes 50, suitably Schottky diodes, on each wire prevents large voltage excursions. The low pass filter section 51 removes AC modulation from AC modulated differential voltage pulses on wires 25a, 25b. The backend section 53, which includes DC blocking capacitors 52, back-to-back diodes 54 (again suitably Schottky diodes), and resistors 56 for common mode voltage control, then provides DC restoration and balancing of the voltage pulses. This backend section compensates for small DC variances induced in the system and clips the signal to a constant value (e.g. a few hundred millivolts) to provide a more predictable and consistent signal for tripping the comparator 55. Comparator 55 is provided at the backend for recovery of the pulse shapes prior to receipt by the UART 57. (The comparator 55 can be part of the CPU as shown in the drawings or external to the CPU.) The above described voltage pulse conditioning would normally be done with a complex AGC system consisting of a lot of active circuitry. The much simpler system illustrated in FIG. 3 does not require active feedback and is self-clamping.

Figure 4A:
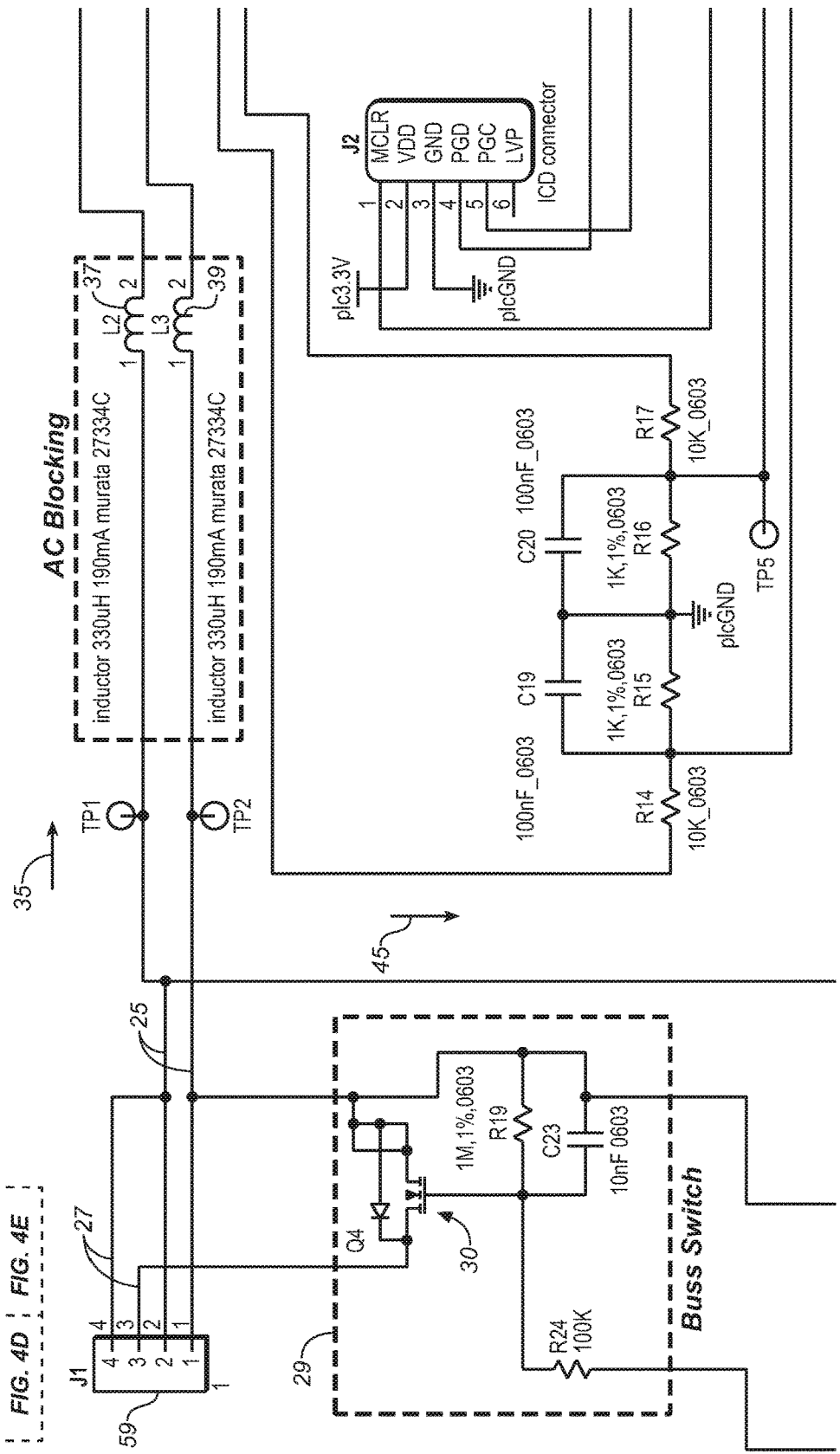
FIGS. 4A-4E show a circuit diagram showing a detailed circuit implementation of the device control modules shown in FIGS. 1-3.

FIGS. 4A-4E represent a circuit diagram showing an implementation of the device control module, including the above-described analog input circuit, in greater detail. This exemplary circuit is adapted for a device control module for a lighting system having multiple lighting elements, such as OLED panels, as the peripheral devices. The circuit segment in FIG. 4A shows a 4-wire connector 59, with inputs "1" and "2" for input wires 25 connecting the device control module or "panel controller" to the DC power buss on the upstream module side, and outputs "3" and "4" for output wires 27 connecting the device control module to the power buss on the side of the downstream modules. (Referring to FIG. 1, it is seen that the output wires 27 of one module become the input wires of the next downstream module.) The DC power path 35 and digital signal communication path 45 are connected to the input side of the wire connector, while the buss chain switch 29, which includes a FET switch 30, is connected on the output side of the connector. The inductors 37, 39 in DC power path 35 provide AC blocking to isolate the communication signals (serial voltage pulses) from the DC power.

Figure 4B:
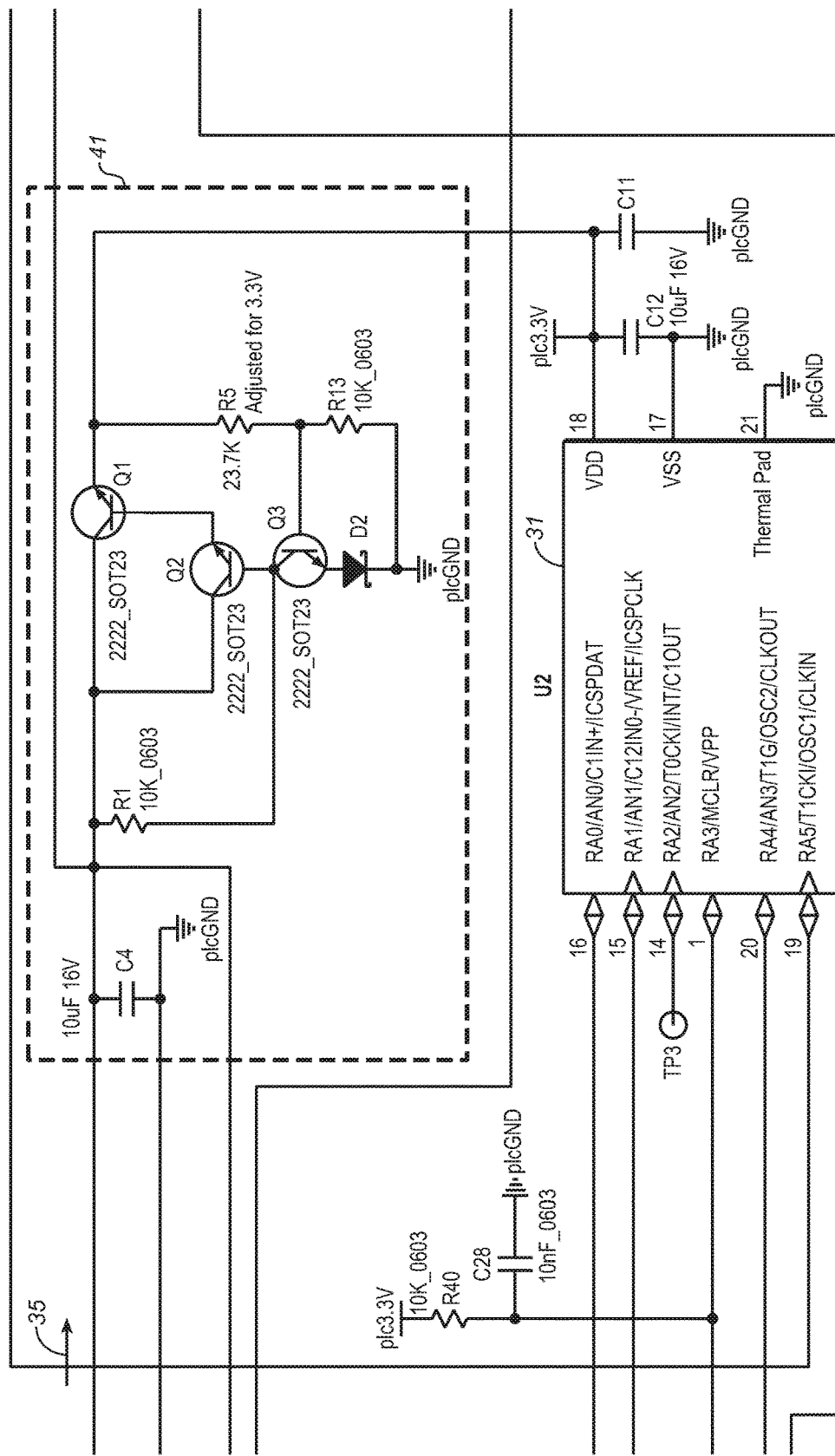
Figure 4C:
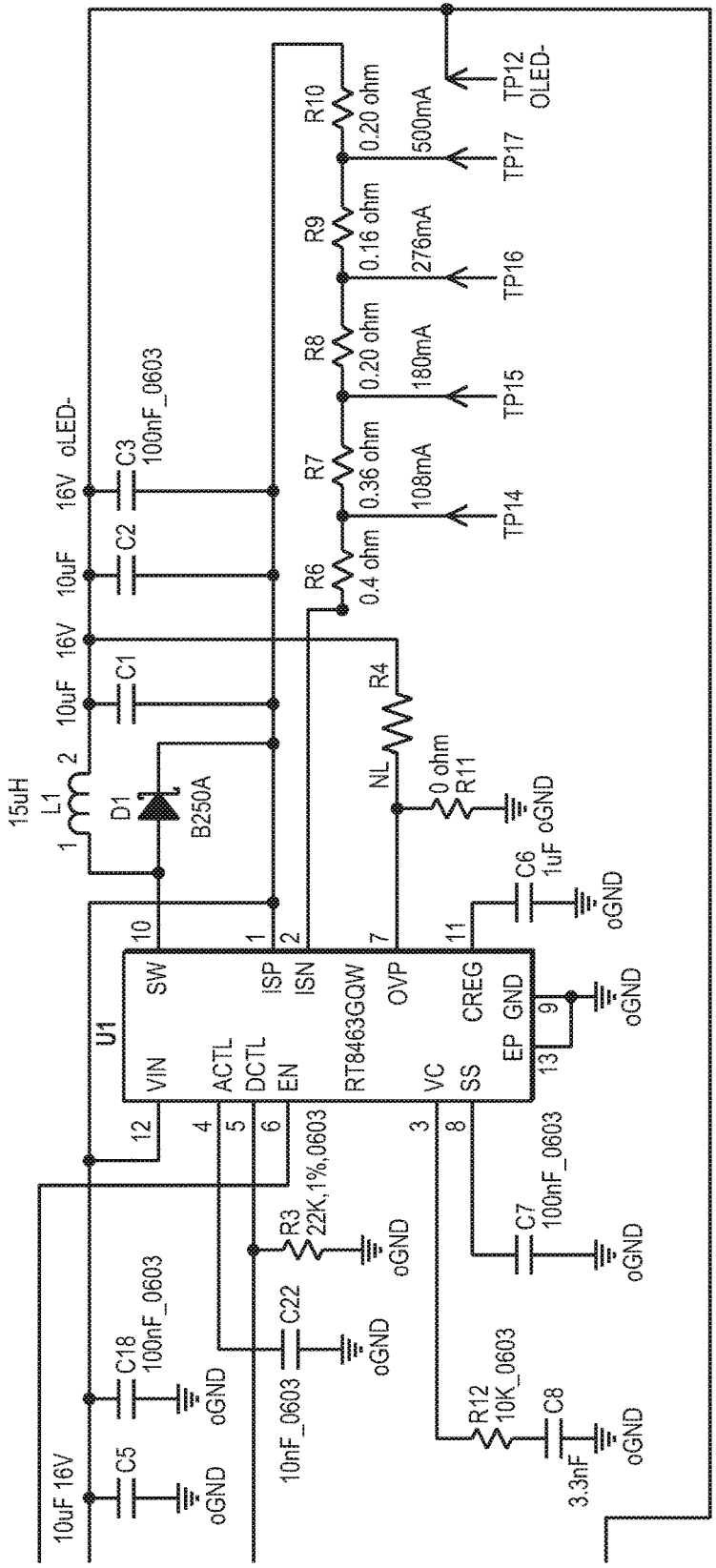

A more detailed schematic of the voltage regulator 41, which regulates the voltage supplied to the CPU, is shown in FIG. 4B. The voltage regulator can, for example, step the voltage down from the 12-volt DC line voltage to 3.3 volts DC. The circuit segment shown in FIG. 4C is an integrated driver circuit for the OLED panel connected to the device control module. This circuit regulates the current supplied to the OLED panels.

Figure 4D:
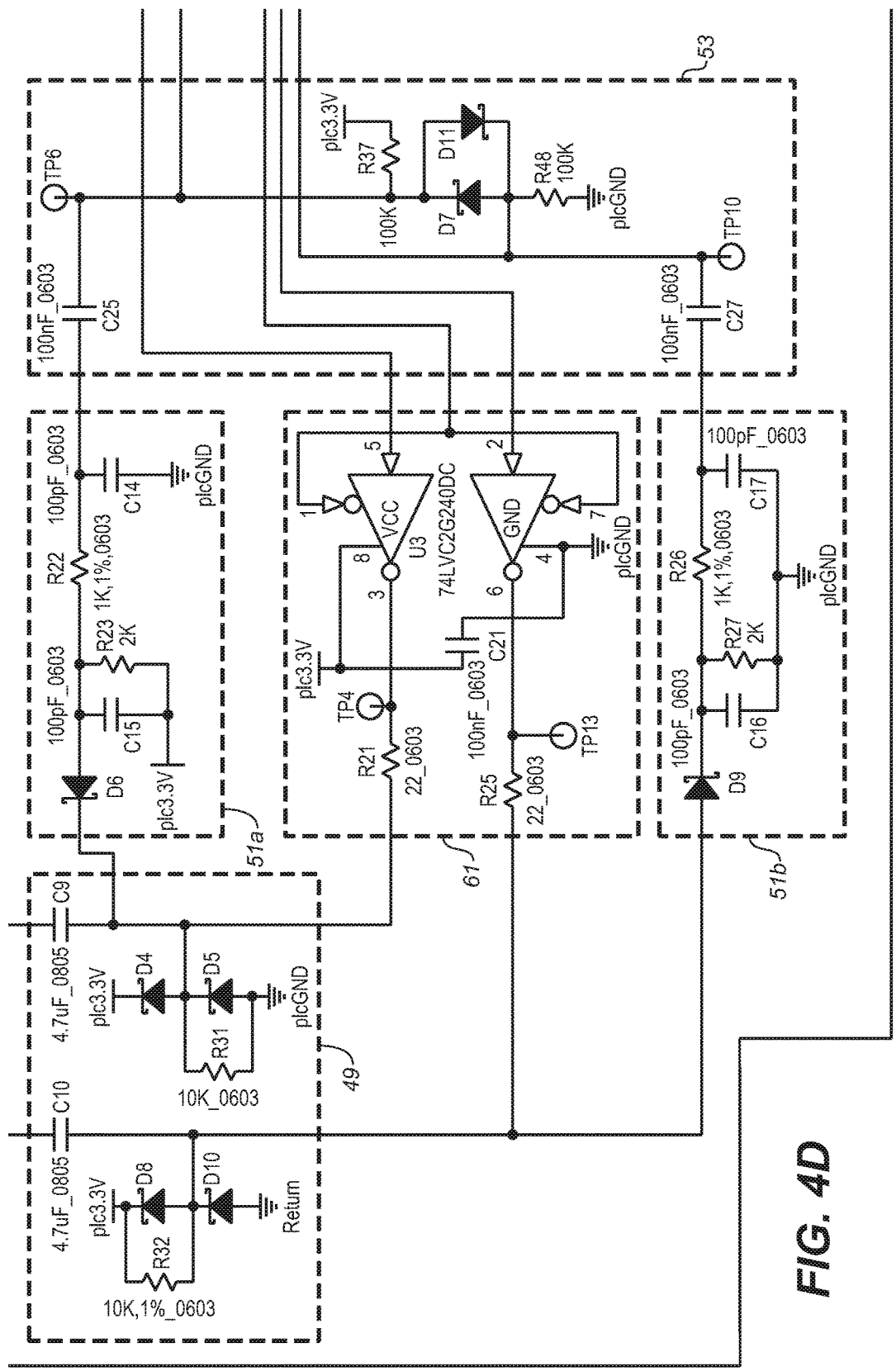

The circuit segment illustrated in FIG. 4D shows the VPC circuit, which is made up of the DC blocking input section 49, the low pass filter section implemented by the two RC circuit blocks 51a, 51b, and the backend section 53. In addition, FIG. 4D shows a transmitter 61, which allows the device control module to communicate with other controllers (nodes) on the PLC system.

Figure 4E:
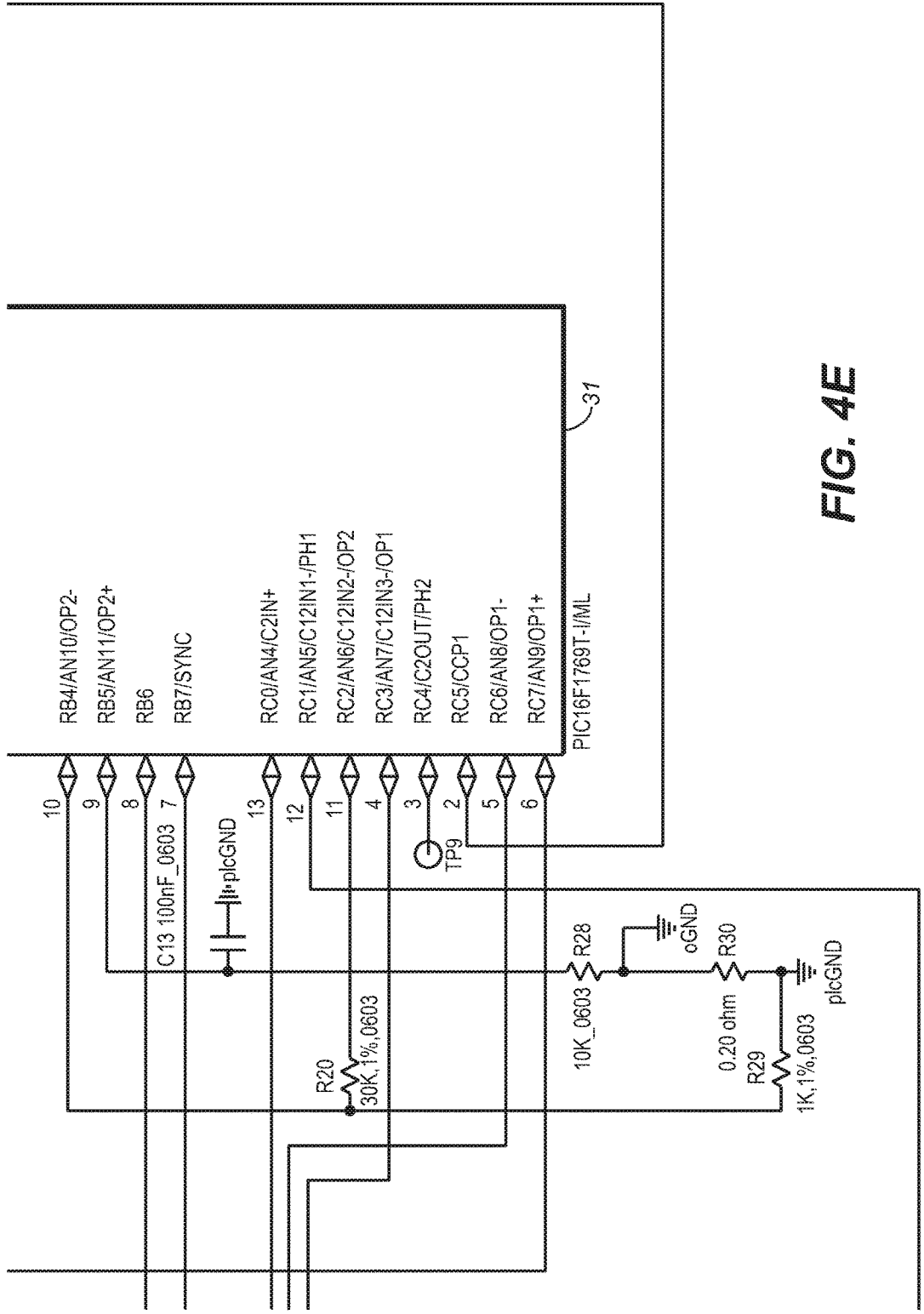

FIG. 4E simply shows the remaining connections to the CPU not shown in the other figures. The CPU can be a simple and inexpensive microprocessor as it only needs to control the one peripheral device and not keep track of the whole system.

Figure 5:
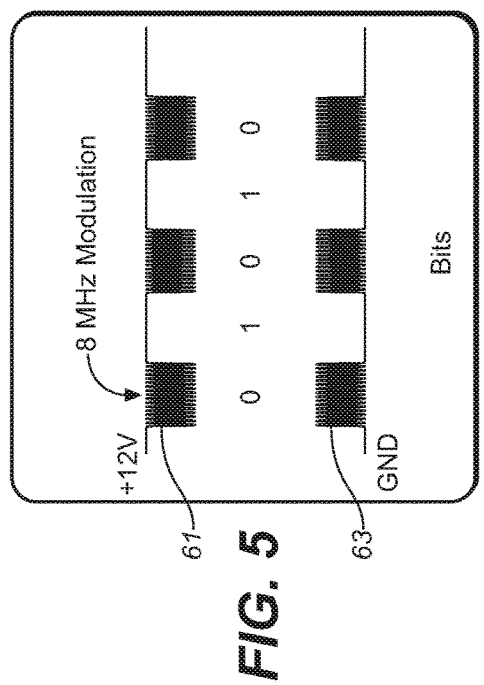
FIG. 5 is a graphical illustration of an AC modulated serial bit stream that is transmitted over the power line of the PLC system for communicating with the device control modules connected to the power line.
Figure 6:
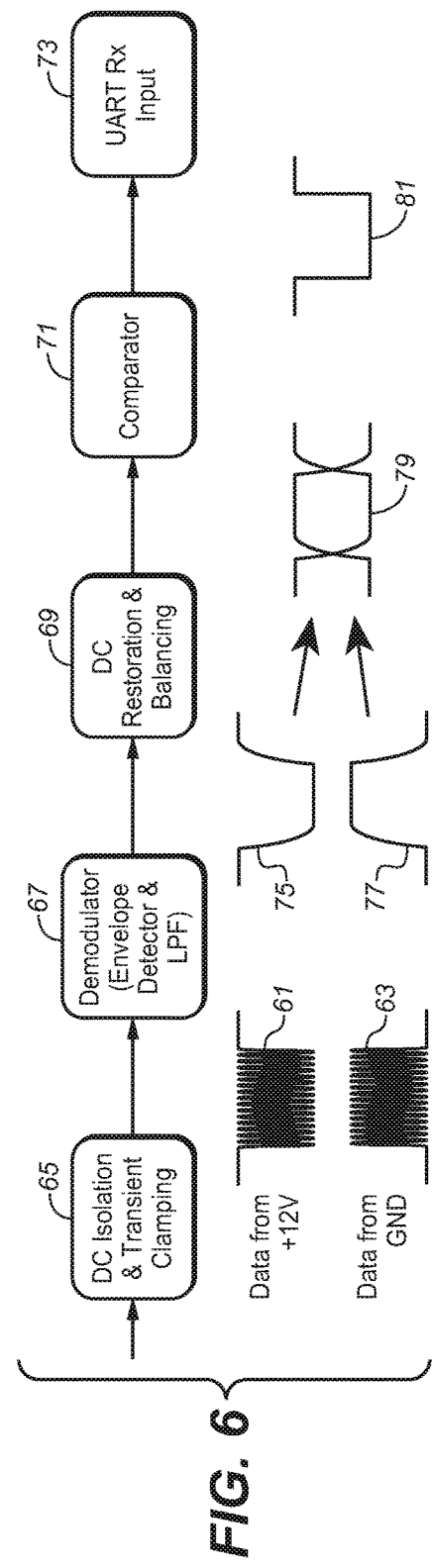
FIG. 6 is block diagram graphically illustrating the functions of the digital signal communication path of the analog input circuit of the device control module, wherein sequences of voltage pulses representing serial digital data and control signals transmitted on the DC power line are removed and restored for inputting to a UART device.

FIGS. 5 and 6 illustrates the voltage pulse conditioning scheme described above wherein the serial data and control signals can be communicated over the PLC system with low cost circuit implementations described above. FIG. 5 shows a serial bit stream comprised of five bits of data representing 1s and 0s. The 0 bits are provided as differential voltage pulses 61, 63 on the two wires of the DC power line 17. The two wires are denoted as +12 v and "GND" for ground. While "GND" for ground is indicated, it will be understood that this does not represent physical ground but rather a return or neutral line. The indicated positive voltage (+12 v) is the voltage relative to the return line. In FIG. 3, the positive wire is denoted 25a and the return or "ground" wire as 25b. In FIGS. 5 and 6, it is seen that the voltage pulses impressed on wires 25a and 25b shown in FIG. 3 are differential, that is of equal and opposite polarity, with the pulses 61 on the positive DC voltage wire being negative and the pulses 63 on the return wire being positive. As illustrated in FIGS. 5 and 6, the voltage pulses on both wires are preferably modulated with a high frequency signal, suitably in the range of 8 Mhz. As indicated above, this AC modulation allows for the use of much smaller inductors in the DC signal path 35.

FIG. 6 illustrates the signal processing that occurs within the voltage conditioning circuit. It is seen here that the AC modulated differential voltage pulses are taken off the DC power line, demodulated and conditioned for the CPU's UART input. As a first step, the voltage pulses undergo DC isolation and transient clamping (block 65), leaving differential AC modulated voltage pulses 61, 63 on the positive and return wires 25a, 25b shown in FIG. 3. Next, a low pass filter removes the AC modulation from the differential voltage pulses leaving differential pulse envelopes 75, 77 (block 67). Then there is a DC restoration of the pulses (block 69) resulting in a composite pulse signal form which can be passed through a comparator (block 71) to achieve properly conditioned and amplified square serial pulses 71 that can be read by the CPU's UART (block 73). The comparator, which is normally a part of the CPU, is a hybrid analog-digital part and the only active component in the receiver side of the device control module.

It is noted that because the device control module circuit shown in FIG. 4 has an integrated driver, it provides a complete control solution that allows the microprocessor (CPU 31) to be utilized for both driver control and communications. This will further minimize cost and size. The 2-wire power line communication buss shown in FIGS. 1-4 simplifies wiring and assembly reducing cost in assembly and also allows the elements to be "normalized" to compensate for various manufacturing inconsistencies. The result is a product that has a much smoother and matched appearance and is easy to service if a failure does occur, as well as having the ability to detect failures from a control network so the facility management can be alerted as soon as a problem is detected. The ability to control individual elements separately if desired in order to provide more complex effects without added wiring complexity is another benefit.

It is also noted that a minimal PLC system would consist of a DC power source, a master control module with an external interface to whatever external protocol is desired, and one device control module or node. However, in most practical applications, the PLC system would have multiple nodes. The master controller (element 19 in FIG. 1) would be very similar in design to the above-described individual device control modules or nodes. It would include a microprocessor (CPU) with some internal modules for UARTs, clock generation, comparators, and some I/O in addition to anything needed for the main external interface of choice. The master controller for the PLC system is less cost sensitive as there is only one master to serve the entire system. Therefore, some external components can be used here if needed, to which the PLC front end can be added.

The transmitter side of the master controller is simply a gate and inverter fed by the UART and a system clock in order to generate a modulated version of the serial UART signal (a sequence of AC modulated voltage pulses described above). It is noted that the AC modulation is not used as a traditional radio carrier. The modulated voltage pulses or signals are differential to minimize EMI and to improve noise immunity.

Again, as above-mentioned, each device control module has a buss chain switch (element 29 in FIGS. 2-4) for controlling the power feed to the rest of the downstream modules on the buss. This switch is an integral part of the commissioning method described below. By daisy-chaining all of the modules/nodes in a string, only the first node will be powered initially and the rest of the nodes powered seriatim after that. In this way each node can be configured and then instructed to energize the next node in the chain. This makes the addressing consistent, repeatable and dependent on the wiring order. With this approach, the nodes can be replaced or swapped without any change in appearance due to the fact that the addressing is dynamic and is wiring position dependent.

The communication protocols and auto-commissioning method of the invention will now be described in reference to FIGS. 7-18, and again in a lighting fixture application where the PLC system is comprised of three kinds of modules: fixture controller, strand controller, and panel controller. A panel controller in this case is a device control module for monitoring and controlling a light panel, such as an OLED panel or LEDs, of a light fixture. A fixture controller is the communications master and is the only module with an external control interface. A panel controller includes a panel driver. It is intended to provide power and control to a small number of light sources (e.g. OLED panels). In the method described herein, a strand controller is a go-between and essentially acts as a packet repeater; however, strand controllers could be implemented that perform processing activities of the master controller. Intervening strand controllers are necessary since there are electrical constraints which limit the maximum number of devices on a single strand. The system transmits data and control signals using the power and return lines which interconnect all controllers (or modules). A master/slave model can be used to enforce half-duplex communications. There is suitably only one communications master in a system. In the described method, slave modules (the above-described device control modules) cannot initiate communications and must be polled by the master for status and control information.

The described PLC system supports two general configurations: small configurations without strand controllers and larger configurations with strand controllers. An example of a small system configuration is shown in FIG. 7. Here, a fixture controller 85, which is connected to a low DC voltage power supply 87, acts as the master controller for a multi-panel lighting fixture. In particular, it controls a single strand 88 of panel controllers 89, which are denoted controllers 1–n. (The light panels controlled by the panel controllers are not shown). Each of the panel controllers 89 can have the device control module circuit configuration described above, and will include a buss chain switch 29 such as shown in FIGS. 2-4 such that the fixture controller only communicates with one panel controller on strand 88 at a time. This small, single strand configuration can support a limited number of daisy chained panel controllers, suitably up to about a dozen or so panel controllers. When the number of panel controllers on a single strand gets much larger than this, one or more strand controllers can be used to distribute the communications load and the operating current load of each strand of fixture panels and panel controllers.

The introduction of a strand controller for this purpose is illustrated in FIG. 8, which shows a strand controller 91 placed in front of and connected to multiple strands of panel controllers designated strands 1–m. Each strand on the strand controller has multiple panel controllers denoted 89*a*, 89*b*, 89*c*. Again, the number of panel controllers in each strand (designated by the letter n) will be limited by the considerations mentioned above.

In either the small or large configurations illustrated in FIGS. 7 and 8, the "personality" of a fixture is implemented solely within the fixture controller. That is, the unique implementation of the user interface, machine interface, and usage logic can be isolated to the fixture controller. The same panel and strand controller firmware (and possibly hardware) may be used in multiple fixtures without modification.

Auto-Commissioning

The PLC system described above and illustrated in FIGS. 1-8 has the unique ability to accommodate the auto-commissioning scheme described below in the context of a lighting fixture or system having multiple controllable light sources ("panels" for discussion purposes). With auto-commissioning, the fixture controller powers up each panel controller one at a time and assigns it a unique address. Since addresses are assigned at power-up, any module can be replaced by a like panel controller and panel without any modification or setup of the fixture. Replacing a panel controller is then a simple matter where the only limiting factor is physical access.

Figure 9:
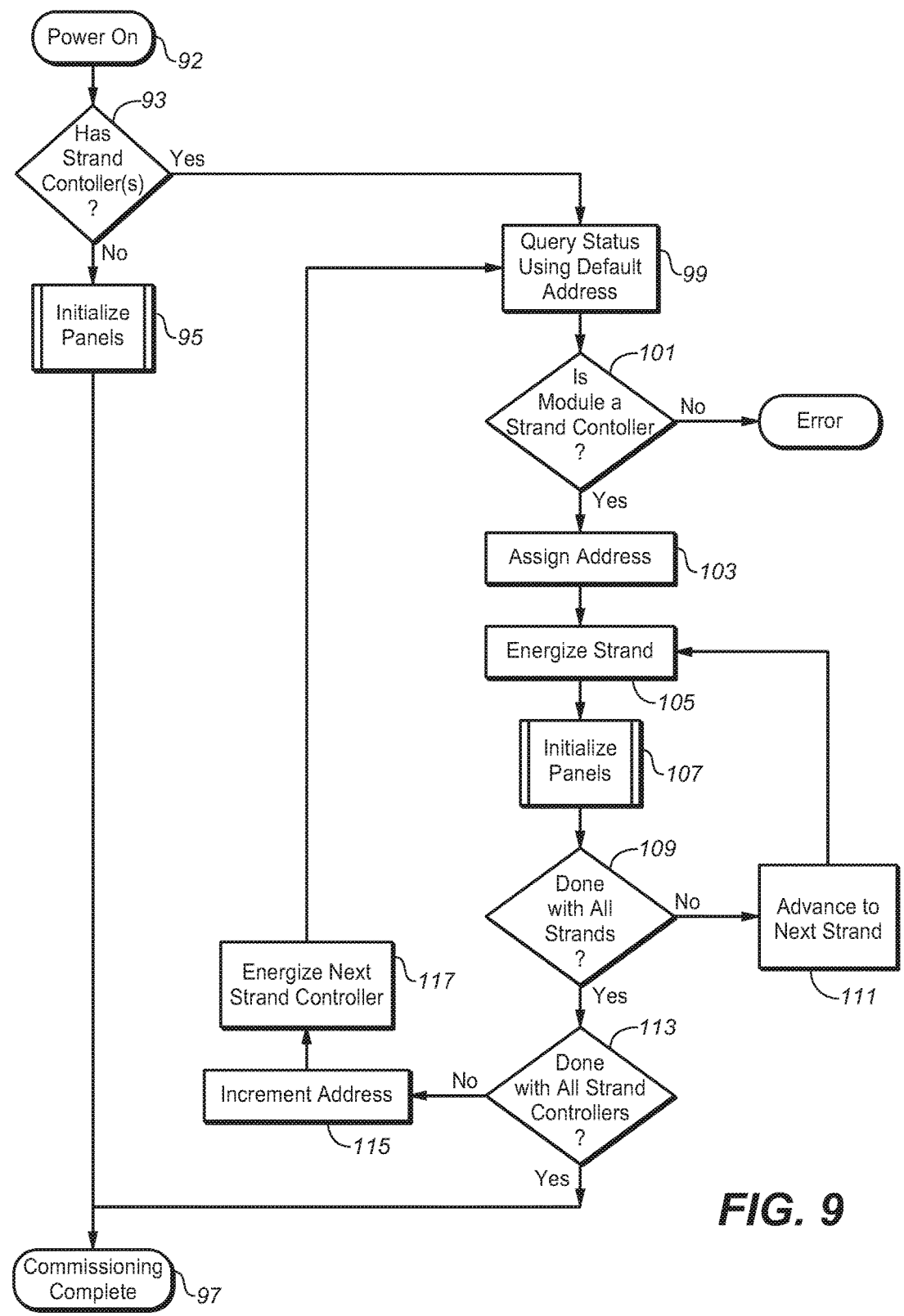
FIG. 9 is a flow diagram showing an auto-commissioning protocol of the power line communication system of the present invention.
Figure 10:
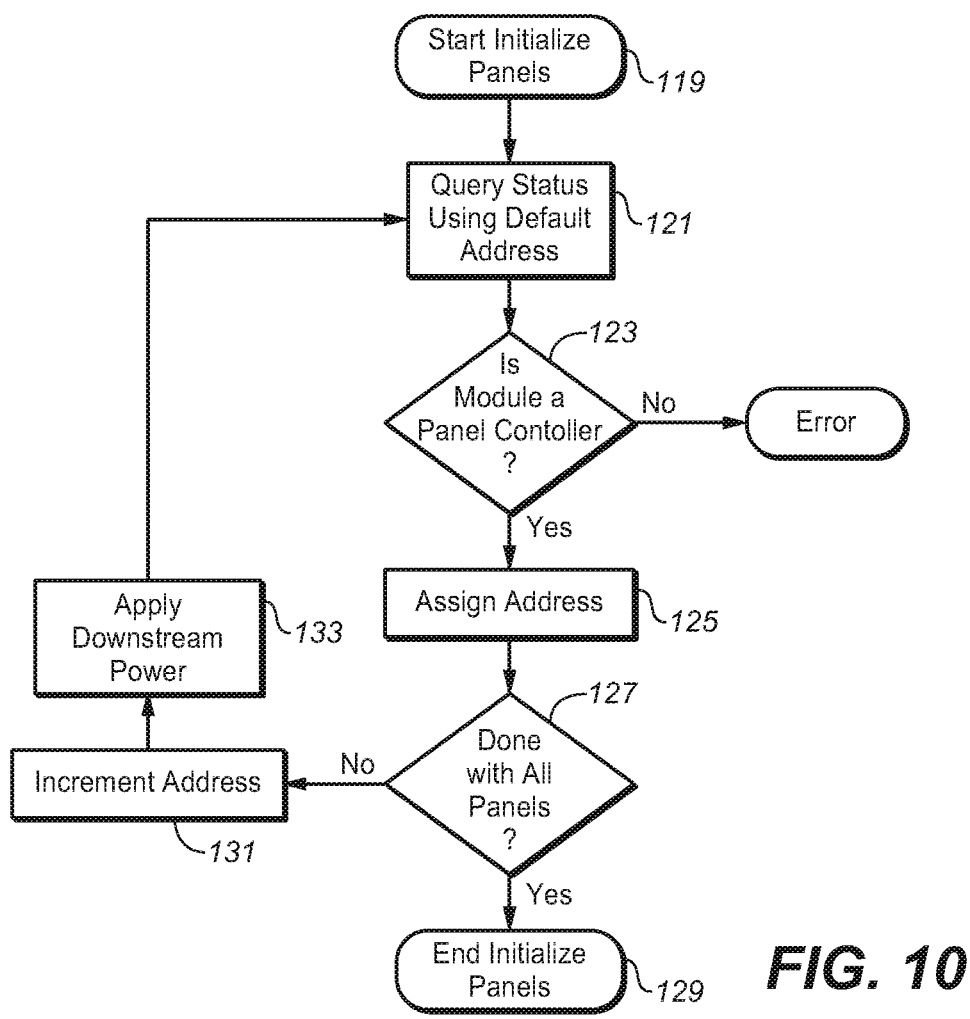
FIG. 10 is a flow diagram showing the strand initialization protocol of the power line communication system of the present invention.

The overall method of commissioning a lighting fixture having multiple panel controllers (device control modules) for multiple light panels of the fixture is illustrated in FIGS. 9 and 10. Commissioning involves the powering up to all device control modules and their associated peripheral devices, and initializing the panels and panel controllers including assigning a unique address to panel controller. It is noted that the initialization process can involve the panel controller communicating with its associated light panel (or other peripheral device) to set the state or status of the panel. In a system that has one or more strand controllers such as illustrated in FIG. 8, the initialization process iterates through each strand controller and each strand connected to the strand controller. In a simpler system without strand controllers as shown in FIG. 7, the system only has to initialize a single strand. Once the panel controllers in the strand have been initialized, its commissioning is complete.

FIG. 9 shows the commissioning process of a multi-panel lighting fixture, which is controlled by a fixture controller. It is seen that commissioning begins when power is turned on (block 92). When the power is turned on, the fixture controller first determines whether a strand controller is present in the system (block 93). If the answer is "no," the fixture controller sequentially initializes the panel controllers in only the strand of panel controllers (block 95) after which the fixture commissioning is complete (block 97). If there are strand controllers in the system, the fixture controller queries the status of the strand controller (are you a "strand controller"?) using a default address pre-assigned to the strand controller (blocks 99 and 101). If the result of this inquiry is negative, an error is detected. Otherwise, the fixture controller assigns a unique address to the strand controller (block 103) and the strand controller is energized (block 105).

The strand controller then initializes the panel controllers (referred to as "panels" in FIGS. 9 and 10) in the strands under its control (block 107). After initializing a strand, the strand controller determines whether all strands under its control have been initialized (block 109) and if not advances to the next strand for initialization (block 111). Once all strands of a strand controller have been initialized by the strand controller, control is handed back to the fixture (master) controller which inquires whether it is done with all strand controllers on the system (block 113). If the answer is "yes," the fixture commissioning is completed (block 97). If the answer is "no," the address is incremented for communicating with the next strand controller (block 115) and the next strand controller is energized (block 117) and assigned an address in a repeat of the sequence of steps represented by blocks 99, 101, 103, 105, 107 109, 111 and 113.

FIG. 10 shows the initialization process for the individual panels and panel controllers whether under the direct control of the master controller (block 95 in FIG. 9) or a strand controller (block 107 in FIG. 9). The master or strand controller starts the initialization process for the panel controllers under its control (block 119). The query is made to the first energized panel controller of a strand using a default address for the panel controller (block 121). If this is a panel controller (block 123), a unique address is assigned to the panel controller (block 125). Otherwise, an error is detected. The master or strand controller then determines if it is done with energizing and assigning unique addresses to panel controllers under its control (block 127). If "no," it increments the address and causes the DC power to be applied to the next-in-line panel controller (block 133). If "yes," the initialization process for all panels and panel controllers in the strand is complete (block 129).

Figure 11A:
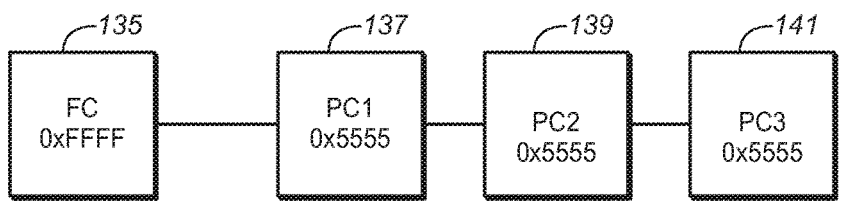
FIGS. 11A-11D are a series of block diagram representations of a power line communication system in accordance with the invention for a lighting fixture having a fixture controller and a string of three panel controllers illustrating power-up sequencing and commissioning of each panel in the string of panels.
Figure 11B:
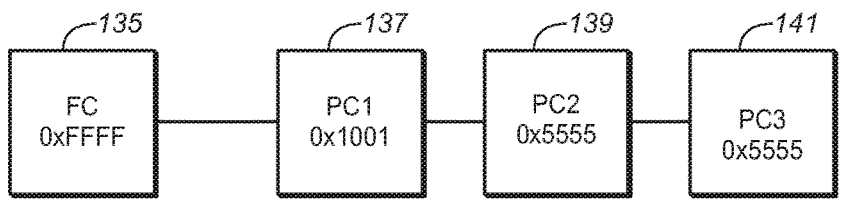
Figure 11C:
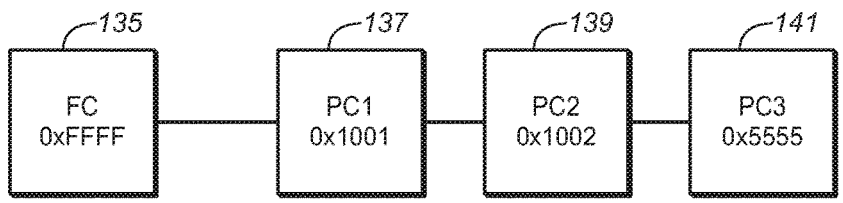
Figure 11D:
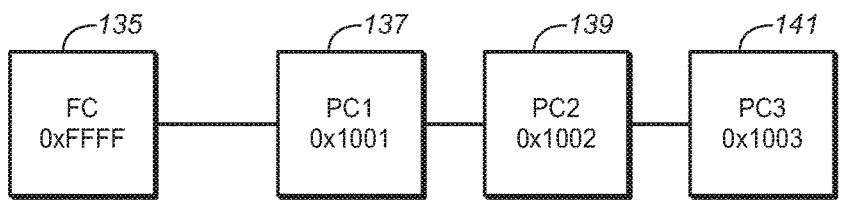

FIGS. 11A-11D shows an protocol assigning unique addresses to each of the panel controllers of a lighting fixture (system) comprised solely of a single fixture (master) controller 135 having an address of 0xFFFF and three panel controllers (device control modules) 137, 139, 141, each of which has a pre-assigned default address of 0x5555. At power up, the only module that has power is the fixture controller and the first panel controller 137. Using the default address initially assigned to this panel controller, the fixture controller is able to communicate with this panel controller (FIG. 11A), and to assign it a new unique address as shown in FIG. 11B. The next in line panel controller 139 can then be powered up—this is done via the controller's previously described buss chain switch 29—and the fixture controller then communicates with this next panel controller using the same default address (0x5555) it used to communicate with the previous panel controller. The fixture controller then assigns a new unique address to this next panel controller as shown in FIG. 11C. This process of energizing, communicating with and assigning new unique addresses to the next in line panel controllers is repeated for the last panel controller 141 as shown in FIG. 11D. In this example, the panel controllers are seen to be assigned addresses in the range 0x1001-0x1003.

Figure 12:
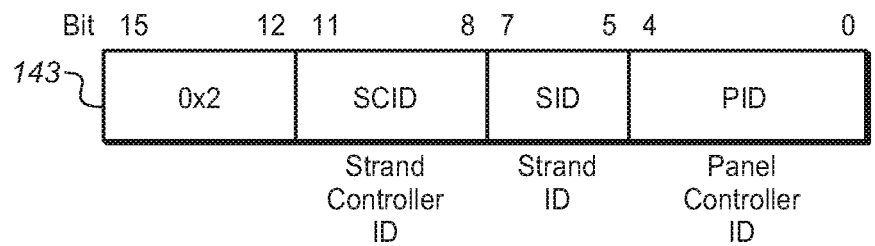
FIG. 12 shows example bit fields for the address of a panel controller using a single strand controller.
Figure 13:
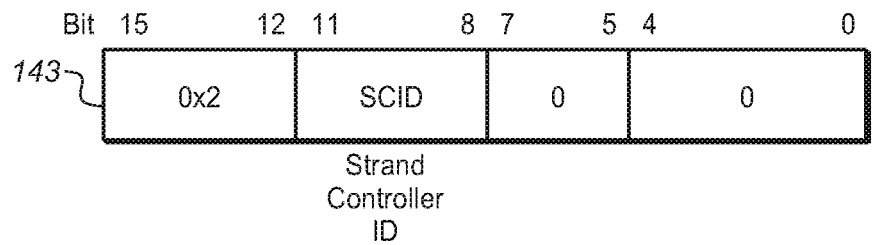
FIG. 13 shows an example of a strand controller address or ID.

System configuration using strand controllers is somewhat more complex, but the basic idea of powering up modules and assigning them addresses one at a time is the same. All modules using a strand controller can, for example, use addresses in the 0x2000-0x2FFF address space. This provides an address space for 0x1000 (4096) modules. However, configuration constraints limit the theoretical maximum to 3503 modules, Maximum strand controllers: 16
Maximum strands per strand controller: 8
If strand controllers are daisy chained, only 1 additional strand controller may be connected
Maximum panel controllers per strand: 31
Maximum panel controllers: 15*7*31+8*31=3503
In the addressing convention specified here, the address of a module is divided into bit fields specifying the strand controller, the strand on that controller, and the panel on the strand. Thus, it is possible to identify a module from its address alone. FIG. 12 shows example bit fields 143 for the address of a panel controller using a single strand controller. Strand controller addresses have the SID and PD set to 0 (see the bit field 143 in FIG. 13).

The initialization sequence for a system with strand controllers is a little more complicated than a system without. When strand controllers are used, panel controllers are never directly connected to the fixture controller. As above-described, the fixture controller looks first for a strand controller. Once it is found, it iterates through all of the panel controllers on each strand (as in the case without a strand controller). When more than one strand controller is implemented, that strand controller is initialized, and so on until the entire fixture is done (see FIGS. 9 and 10).

Figure 14A:
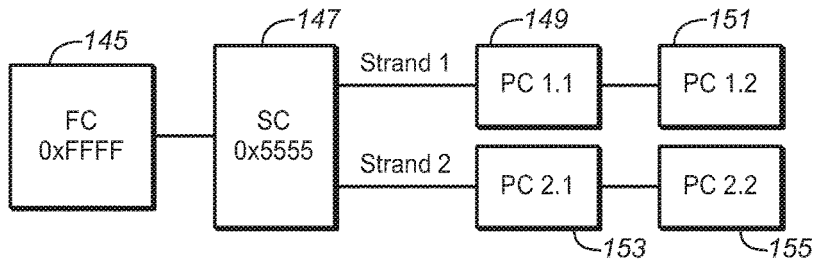
FIGS. 14A-14F are a series block diagram representations of a power line communication system in accordance with the invention for a lighting fixture having a fixture controller, a strand controller, and two strands of panel controllers, and illustrating the power-up sequencing and commissioning of each panel in each strand of panels under the control of the strand controller.
Figure 14B:
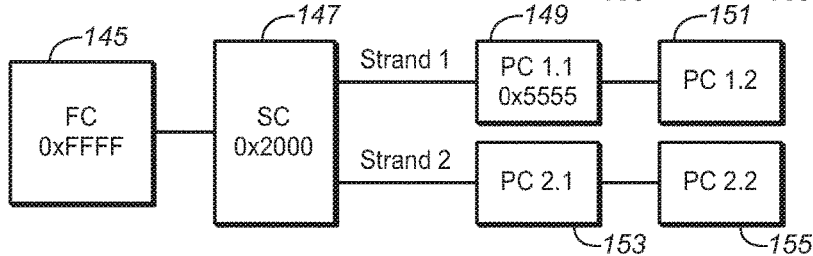
Figure 14C:
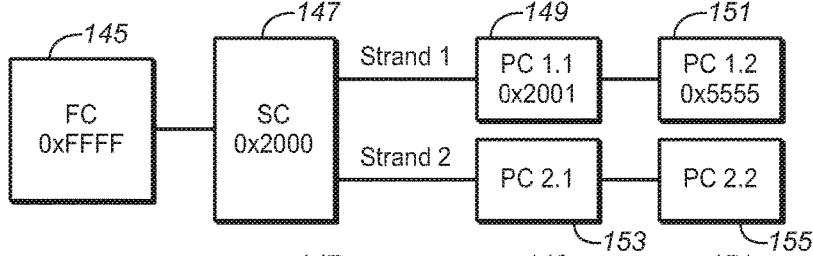
Figure 14D:
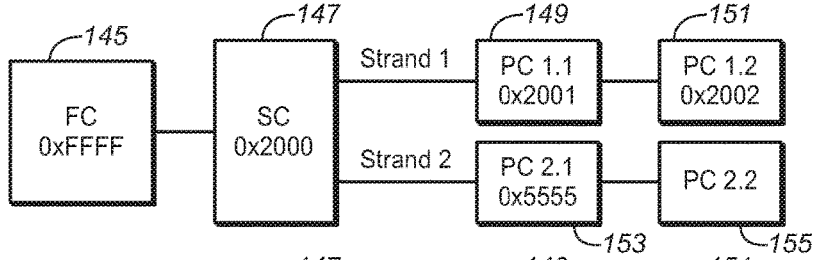
Figure 14E:
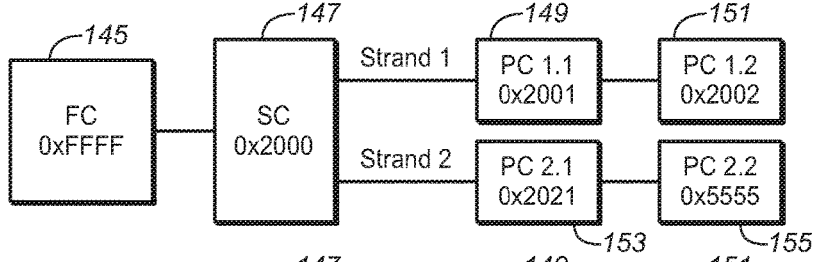
Figure 14F:
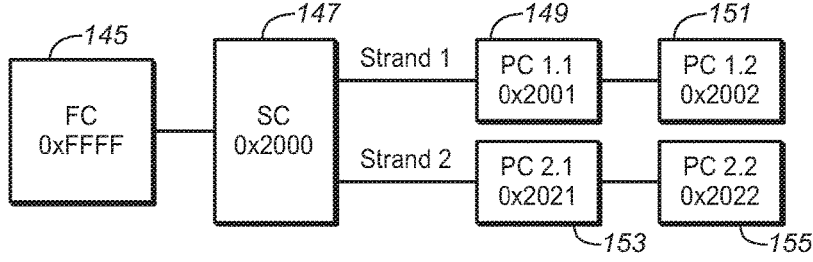

A simple example of auto-addressing initialization with strand controllers present is shown in FIGS. 14A-14F. This example uses one fixture controller 145, one strand controller 147, and two strands of two panel controllers each (these two panel controllers are denoted 149 and 151). At any one time, only one controller (strand or panel) with a default address (0x5555) is powered on so that there is only one controller that will respond to the default address. In the FIG. 14 illustration the sequence starts with the strand controller 147 with default address 0x5555 being powered on so the fixture controller 145 can communicate with this strand controller (FIG. 14A). The fixture controller then assigns a unique address (0x2000) to strand controller 147, whereupon the strand controller is fully initialized and proceeds to energize panel controller 149 having the default address (FIG. 14B). (Again, the powering up of the next in line panel controller can be accomplished through the previously described buss chain switch provider with each controller.) Once powered up, strand controller 147 is able to communicate with the panel controller 149 and assign a new unique address to this panel controller. This sequential powering up and assigning of new unique addresses is repeated with each of the remaining panel controllers 151, 153 and 155 as shown in FIGS. 14C-14F until each panel controller has a unique address and consequently is initialized. This process allows the fixture controller to initialize all control modules one at a time without messages colliding from multiple senders. If additional strand controllers are used, the same initialization sequence is used and extended to each strand controller until all strand controllers (and their panel controllers) are initialized.

Physical Layer

The following chart summarizes exemplary parameters for the physical layer of the communication nodes of the PLC system described herein:

| | |
|---|---|
| Power | Class 2 |
| Signaling | Differential |
| Modulation | Nominally OOK (see below) |
| Communications | Asynchronous serial e.g. RS-232 or RS-485) |
| Data Format | 1 start bit, 1 stop bit, 8 data bits, no parity |
| Baud Rate | 500 kbps |
| Transmission | Half-duplex |
| Max Modules Per Strand | TBD |

The asynchronous serial format is similar to RS-232 or RS-485 in that the frame for a byte of data includes start and stop bits. However, instead of DC levels indicating mark and space, a modulation carrier can be keyed using on/off keying (OOK) to indicate mark and space. (The modulation carrier is also a complementary signal.) It will be understood that the OOK keyed modulation is not used here in the conventional manner as the modulation is stripped off the serial voltage pulses by the voltage pulse conditioning circuit shown in FIG. 3. There is nothing at the other end, e.g. a notch filter, looking for a tone.

Data Link Layer

Figure 15:
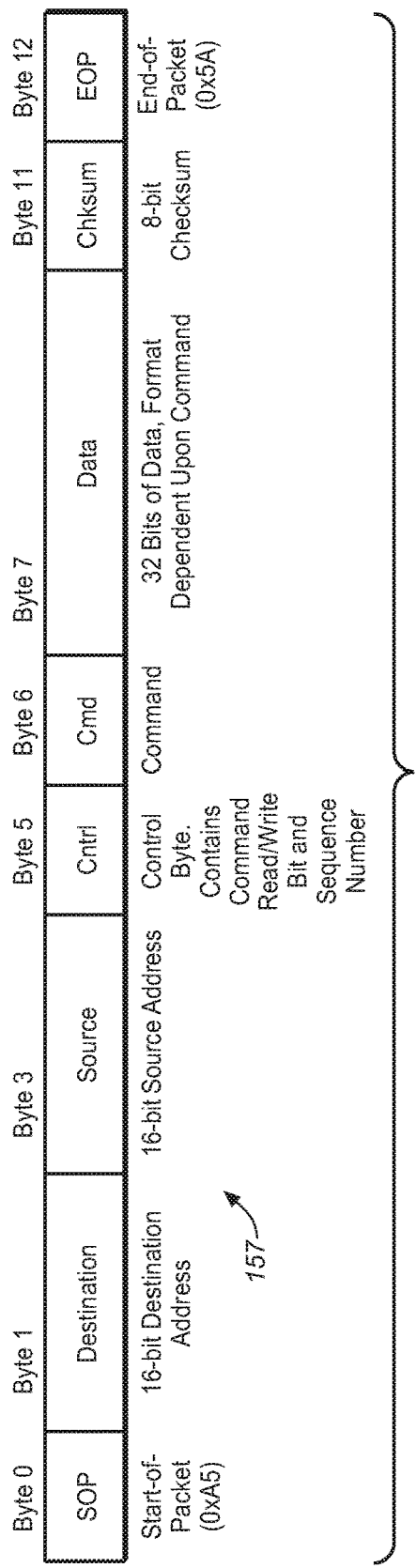
FIG. 15 shows an exemplary packet format for the data link layer of the power line communication system of the present invention.

FIG. 15 shows the packet format for the data link layer of the power line communication system. The packet has a fixed packet size with start-of-packet and end-of-packet markers. The PLC protocol described uses 16-bit addresses. While it is technically possible to use any address on any module, the address space is partitioned to provide support for the modules described herein. All valid addresses are described below in Table 1. All other addresses are reserved.

TABLE 1

16-bit PLC address map

| Start | End | Description |
| --- | --- | --- |
| 0x0000 | — | Broadcast address |
| 0x1000 | 0x10FF | Panel Controller address without a strand controller |
| 0x2000 | 0x2FFF | Addresses for modules using strand controller |
| 0x5555 | — | Default address for strand and panel controllers |
| 0xE000 | 0xEFFF | Multicast address |
| 0xFFFF | — | Default address for fixture controller |

0xFFFF Factory default address for fixture controllers
0xEnnn Multicast address (nnn=000..FFF)
0x5555 Factory default address to strand and panel controllers
0x2s00 Strand controller address (s=4..F)
0x2snn Panel controller address on a strand (s=0..F, nn=01..FF)
0x10nn Panel controller address without a strand controller (nn=01..FF)
0x0000 Broadcast address Data Link Layer—Protocol The PLC communications described herein use a master/slave configuration. All PLC communications are initiated by the master controller, which in this case is a fixture controller. There is only one communications master within a fixture. Communications slaves (panel controllers) may not initiate communications; it is up to the master controller to poll each slave for status if necessary.

Figure 16:
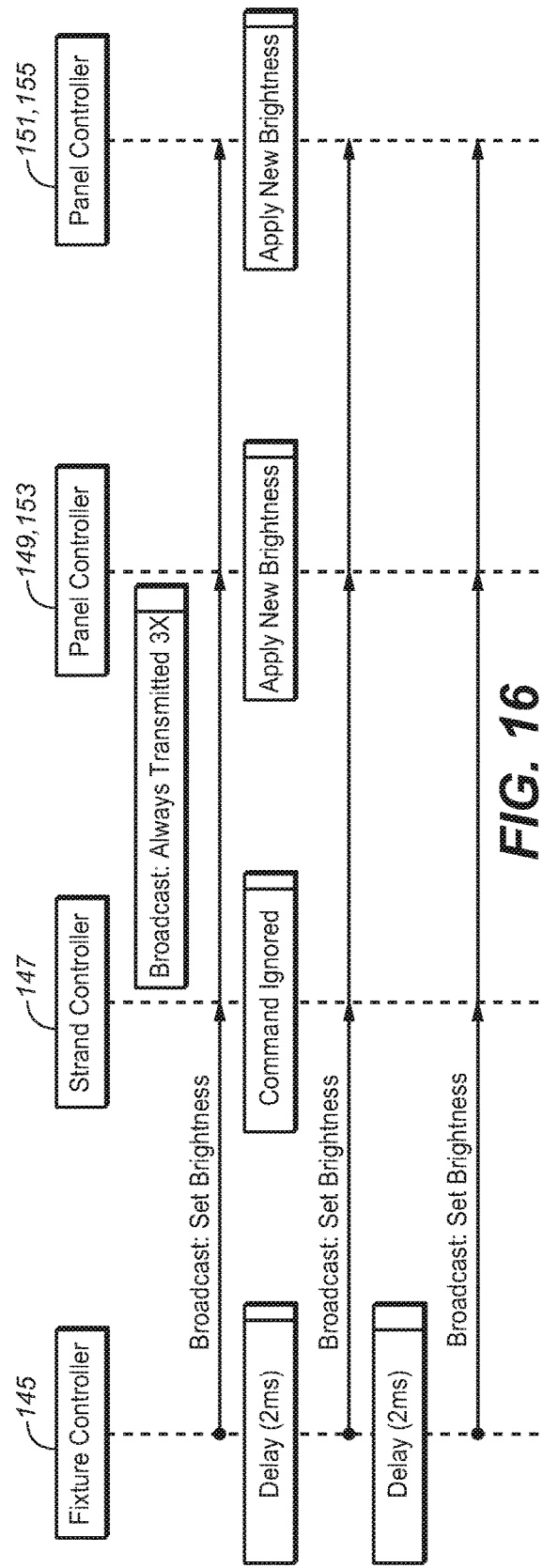
FIG. 16 shows how broadcast transmissions are processed by the receiving modules of the power line communication system of the invention.
Figure 17:
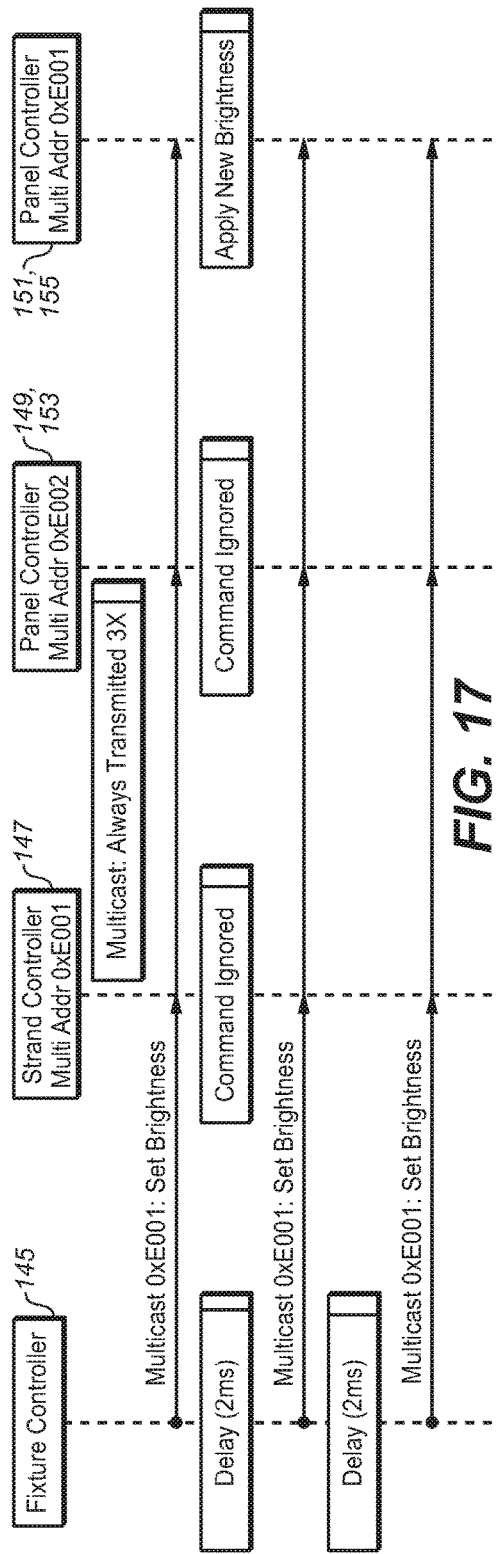
FIG. 17 shows how multicast transmissions are processed by the receiving modules of the power line communication system of the invention.
Figure 18:
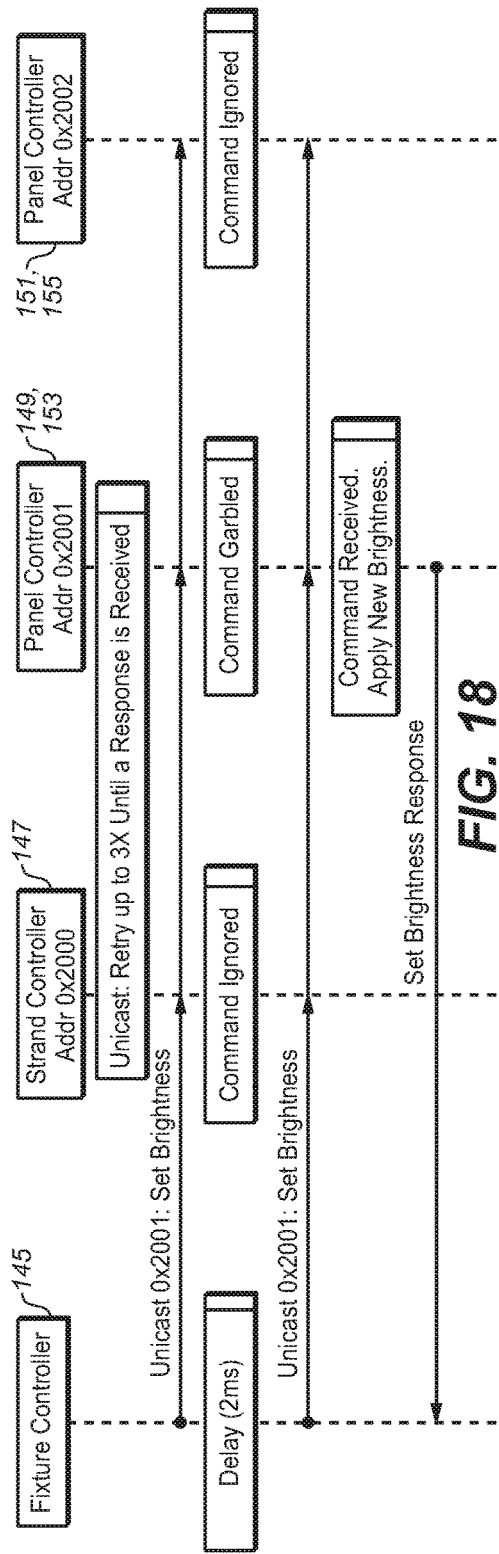
FIG. 18 shows how unicast transmissions are processed by the receiving modules of the power line communication system of the invention.

As illustrated in FIGS. 16-18, the PLC described herein supports three kinds of packet transmissions: broadcast (FIG. 16), multicast (FIG. 17), and unicast (FIG. 18). FIGS. 16-18 illustrate communication protocols for the system configuration shown in FIG. 14, comprised of a fixture controller 145, one strand controller 147, and two strands of panel controllers, strand 1 with panel controllers 149 and 151 and strand 2 with panel controllers 153, 155. The communications are initiated by fixture controller 145, which communicates with the strand controller and panel controllers on strands 1 and 2. In broadcast and multicast transmissions the broadcast transmissions are processed by all receiving controllers, i.e., all strand and panel controllers. If the command does not apply to a particular controller, the command is ignored (see FIG. 16). If the command does apply, no response is generated.

Multicast transmissions use multicast addresses. A controller processes a multicast packet only if it matches its multicast address (see FIG. 17). In the illustrated example, strand and panel controllers may only have one multicast address. No response is generated for a multicast command.

Unicast transmissions are processed only by controllers with that unique address (see FIG. 18). The fixture controller sends a unicast packet and waits for a response. When the timeout period elapses, the packet is retransmitted. This process is repeated until a response is received or until the number of retries is exhausted. If the number of retries is exhausted, that packet is lost. FIG. 18 shows how unicast transmissions are processed by the receiving controllers of the power line communication system of the invention.

While the aspects of the invention have been described in considerable detail in the foregoing specification, it will be understood that the invention shall not be limited to such detail except as necessitated by the following claims.

We claim:

1. An addressable device control module connectable to a DC power line of a power line communication system for powering and communicating with at least one device associated with the device control module, said device control module comprising:
   an analog input circuit for receiving both DC power from the DC power line and sequences of voltage pulses transmitted on the DC power line with DC power, wherein said sequences of voltage pulses represent a serial digital data or control signal, said analog input circuit having a DC power path and a digital signal communication path configured to meet the following conditions:
   i) DC power received from the DC power line passes through the DC power path,
   ii) voltage pulses transmitted on the DC power line and received by the analog input circuit are rejected in the DC power path,
   iii) voltage pulses transmitted on the DC power line pass through the digital signal communication path, and
   iv) DC power from the DC power line is rejected in the digital signal communication path,
   a central processing unit for receiving and processing serial digital data and control signals and for communicating with a device associated with the device control module,
   wherein the central processing unit receives and responds to serial digital data and control signals through the digital signal communication path of the analog input circuit and wherein the device associated with the device control module is powered from DC power transmitted through the DC power path.

2. The addressable device control module of claim 1 wherein the central processing unit is also powered from DC power transmitted through the DC power path of the analog input circuit.

3. The addressable device control module of claim 2 further comprising a voltage regulator in the DC power path, said voltage regulator being configured to regulate the voltage supplied to the central processing unit.

4. The addressable device control module of claim 1 wherein the sequences of voltage pulses transmitted on the DC power line are AC modulated, and wherein the DC power path of the analog input circuit is configured to block the AC modulated sequences of voltage pulses received from the DC power line, and wherein the digital signal communication path is configured to remove the AC modulation from the sequences of voltage pulses.

5. The addressable device control module of claim 4 wherein the digital signal communication path of the analog input circuit is further configured to restore and balance the DC component of the sequence of voltage pulses after the AC modulation has been removed from the sequences of voltage pulses.

6. The addressable device control module of claim 4 wherein the digital signal communication path of the analog input circuit is further configured to restore each of the voltage pulses of the sequence of voltage pulses passing therethrough to a shape detectable by the central processing unit after the AC modulation has been removed from the sequences of voltage pulses.

7. The addressable device control module of claim 1 wherein the device control module further comprises:
 an input connected to the DC power line through which DC power and sequences of voltage pulses on the DC power line are received by said analog input,
 an output; and
 a power line switch in the output of the device control module, said switch being configured to connect the output of the device control module to the DC power line when the switch is activated, wherein DC power and serial digital data and control signals on the DC power line upstream of the device control module are only available on the DC power line downstream of the device control module upon activation of said power line switch.

8. The addressable device control module of claim 1 wherein the power line switch in the output of the device control module is responsive to commands from the central processing unit, wherein DC power and serial digital data or control signals on the DC power line upstream of the device control module are only available on the DC power line downstream of the device control module upon receipt of a command from the central processing unit.

9. An addressable device control module connectable to a DC power line of a power line communication system for powering and communicating with at least one device associated with the device control module, said communication system comprising:
 an analog input circuit for receiving both DC power from the DC power line and sequences of AC modulated voltage pulses transmitted on the DC power line with DC power, wherein said sequences of AC modulated voltage pulses represent a serial digital data or control signal, said analog input circuit having a DC power path and a digital signal communication path configured to meet the following conditions:
  i. DC power received from the DC power line passes through the DC power path,
  ii. AC modulated voltage pulses transmitted on the DC power line and received by the analog input circuit are rejected in the DC power path,
  iii. voltage pulses transmitted on the DC power line pass through and are conditioned in the digital signal communication path, the conditioning of the voltage pulses including the removal of the AC modulation from the voltage pulses, and
  iv. DC power from the DC power line is rejected in the digital signal communication path,
 a central processing unit for receiving and processing serial digital data and control signals and for communicating with a device associated with the device control module,
 wherein the central processing unit receives and responds to serial digital data and control signals through the digital signal communication path of the analog input circuit and wherein both the device associated with the device control module and the central processing unit are powered from DC power transmitted through the DC power path.

10. The addressable device control module of claim 9 further comprising a voltage regulator in the DC power path, said voltage regulator being configured to regulate the voltage supplied to the central processing unit.

11. The addressable device control module of claim 9 wherein the device control module further comprises:
 an input connected to the DC power line through which DC power and sequences of voltage pulses on the DC power line are received by said analog input,
 an output; and
 a power line switch in the output of the device control module, said switch being configured to connect the output of the device control module to the DC power line when the switch is activated, wherein DC power and serial digital data and control signals on the DC power line upstream of the device control module are only available on the DC power line downstream of the device control module upon activation of said power line switch.

12. The addressable device control module of claim 11 wherein the power line switch in the output of the device control module is responsive to commands from the central processing unit, wherein DC power and serial digital data or control signals on the DC power line upstream of the device control module are only available on the DC power line downstream of the device control module upon receipt of a command from the central processing unit.

13. An addressable device control module connectable to a DC power line of a power line communication system for powering and communicating with at least one device associated with the device control module, said communication system comprising:
 an input connected to the DC power line through which DC power and sequences of voltage pulses on the DC power line are received, said sequences of voltage pulses representing a serial digital data or control signal,
 an output;
 a power line switch in the output of the device control module, said power line switch being configured to connect the output of the device control module to the DC power line when the switch is activated, wherein DC power and serial digital data and control signals on the DC power line upstream of the device control module are only available on the DC power line downstream of the device control module upon activation of said power line switch,
 a central processing unit for receiving and processing serial digital data and control signals received from the DC power line through the input of the device control module connected to the DC power line and being configured to issue a command to the power line switch in the output of the device control module,
 the power line switch being responsive to commands from the central processing unit, wherein, in response to a command from the central processing unit, the power line switch is activated to connect the output of the device control module to the DC power line wherein DC power and serial digital data and control signals on the DC power line upstream of the device control module become available on the DC power line downstream of the device control module.

14. An addressable device control module of claim 13 wherein the central processing unit is configured to store an address used to communicate with the addressable device control module, and is configured to send a command to activate the power line switch in the output of the device control module upon the storing of a new address in the central processing unit.

15. An addressable device control module of claim 14 further comprising a DC power path and a digital signal communication path connected to the input of the device module, wherein the device associated with the device control module and the central processing unit are energized through the DC power path and the serial digital data and control signals on the DC power line are received by the central processing unit through the digital signal communication path.

16. An addressable device control module of claim 15 wherein the digital signal communication path is configured to condition the serial digital data and control signals received from the DC power line through the input of the device control module for processing by the central processing unit.

17. An addressable device control module of claim 14 wherein the digital data and control signals received from the DC power line are AC modulated, wherein the DC power path is configured to reject the AC modulated digital data and control signals, and wherein the digital signal communication path is configured to remove the AC modulation from the digital data and control signals.

18. The addressable device control module of claim 14 further comprising a voltage regulator in the DC power path, said voltage regulator being configured to regulate the voltage supplied to the central processing unit through the DC power path.

19. A power line communication (PLC) system comprising:
a plurality of addressable device control modules, each of the device control modules having an input connected to a DC power line and an output, said device control modules configured to provide power to and communicate with at least one device associated with the device control module,
a master controller connected to the DC power line and configured to transmit digital data and control signals over the DC power line for communicating with the device control modules, including transmitting an address to the device control modules,
each of said addressable device control modules having a power line switch in the output of the device control module, said power line switch being configured to connect the output of the device control module to the DC power line when the switch is activated, wherein DC power and serial digital data and control signals on the DC power line upstream of the device control module are only available to the next downstream device control module upon activation of said power line switch.

20. The power line communication (PLC) system of claim 19 wherein the device control modules are daisy-chained on the DC power line in one or more strands such that the master control module powers up and communicates with a first one of the device control modules in the strand, and then powers up and communicates with the next-in-line control modules in the strand one at a time as the power line switch of each device control module is activated to bring the next-in-line device control module on line.

21. The power line communication (PLC) system of claim 20 further comprising more than one strand of daisy-chained device control modules and a strand controller between the master controller and strands of device control modules, wherein the master controller powers up and communicates with the strand controller and wherein the strand controller is configured to allow powering up and communication with the device control modules on each strand under its control one at a time.

22. The power line communication (PLC) system of claim 19 wherein each device control module has a default address, and wherein the device control module is configured to activate its power line switch to bring the next device control module on-line after the device control module receives a new unique address transmitted by the master controller.

23. The power line communication (PLC) system of claim 19 wherein each of the device control modules has a DC power path and a digital signal communication path connected to the input of the device module, wherein the device associated with the device control module is powered through the DC power path and all communications with the device control module occur through the digital signal communication path.

24. The power line communication (PLC) system of claim 23 wherein the digital data and control signals transmitted by the master controller are AC modulated, wherein the DC power path of each device control module is configured to block the AC components of the AC modulated digital data and control signals, and wherein the digital signal communication path is configured to remove the AC modulation from the digital data and control signals.

25. A method for auto-commissioning multiple addressable device control modules on a DC power line, wherein each of said device control modules is used to provide power to and communicate with at least one device, wherein each device control module is capable of storing an address, and wherein the multiple addressable device control modules are daisy-chained together such that they can only be powered up one at a time, the method comprising:
storing a default address in each device control module,
using its default address, powering up a first one of the multiple device control modules,
assigning a unique address to said first device control module,
using its default address, powering up the next one of the multiple device control modules,
assigning a unique address to said next device control module,
repeating the foregoing steps until all remaining device control modules are powered up and have unique addresses that can be used to communicate with the device control modules over the DC power line.

* * * * *